US011318000B2

(12) United States Patent
Choi et al.

(10) Patent No.: US 11,318,000 B2
(45) Date of Patent: May 3, 2022

(54) DIGITAL DENTAL PROSTHESIS AND METHOD FOR MANUFACTURING SAME

(71) Applicant: DIO Corporation, Busan (KR)

(72) Inventors: Byung Ho Choi, Wonju-si (KR); Seung Mi Jung, Wonju-si (KR); Jin Cheol Kim, Yangsan-si (KR); Jin Baek Kim, Busan (KR)

(73) Assignee: DIO CORPORATION, Busan (KR)

( * ) Notice: Subject to any disclaimer, the term of this patent is extended or adjusted under 35 U.S.C. 154(b) by 0 days.

(21) Appl. No.: 16/963,530

(22) PCT Filed: Jan. 29, 2019

(86) PCT No.: PCT/KR2019/001192
§ 371 (c)(1),
(2) Date: Jul. 21, 2020

(87) PCT Pub. No.: WO2019/151740
PCT Pub. Date: Aug. 8, 2019

(65) Prior Publication Data
US 2021/0045853 A1     Feb. 18, 2021

(30) Foreign Application Priority Data

Jan. 30, 2018  (KR) .................. 10-2018-0011397

(51) Int. Cl.
*A61C 13/107*  (2006.01)
*A61C 8/00*    (2006.01)
*A61C 13/00*   (2006.01)

(52) U.S. Cl.
CPC ........ *A61C 13/0001* (2013.01); *A61C 8/0095* (2013.01); *A61C 13/0004* (2013.01)

(58) Field of Classification Search
CPC ..... A61C 17/02; A61C 17/0208; A61C 17/20; A61C 5/50; A61C 13/0001; A61C 13/0004; A61C 13/225; A61C 8/0095
(Continued)

(56) References Cited

U.S. PATENT DOCUMENTS 9,566,138 B2 *  2/2017  Fisker ................... A61C 13/01
9,730,777 B2 *  8/2017  Bullis ................... A61C 8/0048
(Continued)

FOREIGN PATENT DOCUMENTS

CA    2597036 A1 *  8/2006 ........... A61C 9/0046
EP    3216419 A1 *  9/2017 ............ A61C 11/00
(Continued)

*Primary Examiner* — Jacqueline T Johanas
*Assistant Examiner* — Madison E Bondoc
(74) *Attorney, Agent, or Firm* — Lex IP Meister, PLLC

(57) ABSTRACT

The present invention provides a digital dental prosthesis manufacturing method including a first step in which a three-dimensional work image is acquired, the three-dimensional work image including surface information on an inner side of an oral cavity and a target dental arch in which fixtures are placed and occlusion information between the target dental arch and an opposing dental arch; a second step in which a temporary digital dental prosthesis is designed and manufactured; a third step in which the manufactured temporary digital dental prosthesis is installed on the target dental arch; and a fourth step in which a virtual coupling groove, which corresponds to surface information on the corrected coupling region, is set in an inner surface profile, which is set according to surface information on the corrected temporary shape-matching surface that is included in the corrected scan image, and a final digital dental prosthesis is designed and manufactured.

7 Claims, 9 Drawing Sheets

(58) Field of Classification Search
USPC .......................................................... 433/81
See application file for complete search history.

(56) References Cited

U.S. PATENT DOCUMENTS

| | | | | |
|---|---|---|---|---|
| 10,813,728 | B2* | 10/2020 | Morales | A61C 13/08 |
| 2012/0258430 | A1* | 10/2012 | Ruppert | A61C 13/10 |
| | | | | 433/199.1 |
| 2014/0255873 | A1* | 9/2014 | Bullis | A61C 8/0048 |
| | | | | 433/199.1 |
| 2014/0272797 | A1* | 9/2014 | Prestipino | A61C 8/0054 |
| | | | | 433/199.1 |
| 2015/0230894 | A1 | 8/2015 | Juzbasic et al. | |
| 2017/0042705 | A1* | 2/2017 | Cook | A61L 31/18 |
| 2018/0333226 | A1* | 11/2018 | Tsai | B29C 51/46 |

FOREIGN PATENT DOCUMENTS

| | | |
|---|---|---|
| KR | 10-2011-0086035 | 7/2011 |
| KR | 10-2013-0097216 | 9/2013 |
| KR | 10-2016-0102909 | 8/2016 |

* cited by examiner

DIGITAL DENTAL PROSTHESIS AND METHOD FOR MANUFACTURING SAME

TECHNICAL FIELD

The present invention relates to a digital dental prosthesis and a method of manufacturing the same, and more particularly, to a digital dental prosthesis and a method of manufacturing the same in which manufacturing convenience and precision are improved.

BACKGROUND ART

Generally, a dental prosthesis is an artificial periodontal tissue in the oral cavity that replaces a missing natural tooth and artificially restores an appearance and function thereof.

Specifically, when a missing natural tooth is left unreplaced, teeth adjacent to and opposing the missing tooth may be twisted and face distortion may occur, and masticatory function may be degraded and the inconvenience of daily life may be increased. Moreover, when a missing natural tooth is not replaced for a long period of time, there is a problem in that an alveolar bone surrounding the missing tooth is absorbed into the body, making it difficult to install an artificial periodontal tissue. Here, the dental prosthesis may be installed inside the oral cavity to restore the masticatory function and prevent deformation of the periodontal tissue and may be classified as partial dental prosthesis or full dental prosthesis according to the number of missing teeth.

Meanwhile, the dental prosthesis may be installed inside the oral cavity using a fixture or an abutment placed in the alveolar bone. The dental prosthesis has been used increasingly due to its ability to address a conventional problem in which a denture fixed using an adhesive so as to be used causes deformation of gums or a strong foreign body sensation due to coming in direct contact with and being supported by the gums.

Specifically, a coupling hole in which a support cylinder is embedded is formed in the dental prosthesis. That is, when a perforation is formed in the alveolar bone, a fixture is placed in the formed perforation. Then, when an abutment is installed on the placed fixture, the support cylinder is coupled to the installed abutment so that the dental prosthesis may be installed inside the oral cavity. Here, the support cylinder and the abutment/fixture may be formed at a plurality of sites according to the size of the dental prosthesis, and, as each support cylinder is matched one-to-one and coupled to each abutment/fixture, the dental prosthesis may be stably installed.

However, conventionally, because a method is used in which, after a dental prosthesis is manufactured, an installation position of the dental prosthesis inside the oral cavity and a placement position of a fixture/abutment are predicted, a coupling hole is processed, and then a support cylinder is embedded therein, there is a problem in that the positional deviation of the coupling hole is high.

That is, the support cylinder is fastened to the fixture/abutment placed and installed in the alveolar bone, and then a dental prosthesis, in which a large-sized coupling hole is primarily formed in consideration of manufacturing errors, is located inside the oral cavity. Then, the coupling hole is expanded according to the positional deviation between the support cylinder and the abutment, and, when processing of the coupling hole is completed into a size that allows the support cylinder to be completely inserted into the coupling hole and pass therethrough, the dental prosthesis is temporarily fixed to a predetermined installation position. Then, the coupling hole and the support cylinder are coupled through a process in which a resin is injected between the coupling hole and the support cylinder and cured. In this way, the initial installation process for the dental prosthesis is completed.

Thus, there is a problem in that the process of installing the dental prosthesis becomes extremely complicated, and, because a subsequently-cured resin has a weak supporting force on a main body of the dental prosthesis and is easily separated therefrom, there is a problem in that the installation stability and durability of the dental prosthesis are degraded. In order to address such problems, a method has been used in which a dental prosthesis is manufactured by fastening an impression coping or the like to a fixture, taking an impression of a target dental arch, forming a model of the target dental arch using an inner surface profile of the impression taken, and setting the position and angle of a coupling hole on the basis of the impression coping.

However, the method in which an impression is taken has a problem in that a patient may feel discomfort due to a foreign body sensation while an impression is being taken. Also, there are problems in that the burden on the operator is increased due to several process steps which are complicated and highly difficult, and, because errors in each process overlap in many cases, precision is decreased.

DISCLOSURE

Technical Problem

The present invention is directed to providing a digital dental prosthesis and a method of manufacturing the same in which the manufacturing convenience and precision are improved.

Technical Solution

The present invention provides a digital dental prosthesis manufacturing method including: a first step in which a three-dimensional work image is acquired, the three-dimensional work image including surface information on an inner side of an oral cavity and a target dental arch in which fixtures are placed and occlusion information between the target dental arch and an opposing dental arch; a second step in which a temporary digital dental prosthesis is designed and manufactured, the temporary digital dental prosthesis including a temporary tooth part having one side which, on the basis of the occlusion information, occludes with and corresponds to the opposing dental arch and the other side at which a temporary shape-matching surface, a shape of which matches a shape of the target dental arch, is formed and a coupling region is disposed to be aligned corresponding to arrangement positions of the fixtures and including an aligning shape-matching part integrally connected to an edge of the temporary tooth part and formed to have a shape that matches the surface information on the inner side of the oral cavity that is included in the three-dimensional work image; a third step in which the manufactured temporary digital dental prosthesis is installed on the target dental arch, wherein a corrected scan image of the temporary digital dental prosthesis is acquired in which the temporary shape-matching surface and the coupling region are corrected, and the aligning shape-matching part is incised to be separated and removed from the temporary tooth part; and a fourth step in which a virtual coupling groove, which corresponds to surface information on the corrected coupling region, is set in an inner surface profile, which is set according to surface information on the corrected temporary shape-matching surface that is included in the corrected scan image, and a final digital dental prosthesis is designed and manufactured.

The present invention provides a digital dental prosthesis including: a temporary tooth part in which, on the basis of a three-dimensional work image having surface information on an inner side of an oral cavity and a target dental arch in which fixtures are placed and occlusion information between the target dental arch and an opposing dental arch displayed therein, a profile of a temporary occlusal surface part which occludes with the opposing dental arch is formed at one side, on the basis of surface information on a target dental arch-side gum part, a profile of a temporary shape-matching surface, a shape of which matches a shape of the target dental arch, is formed at the other side, and a coupling region is formed at a plurality of sites and disposed to be penetrated vertically and aligned corresponding to arrangement positions of the fixtures; and an aligning shape-matching part configured to integrally extend from a boundary surface of an edge of the temporary tooth part and formed to be curved corresponding to a shape of the inner side of the oral cavity on the basis of the surface information on the inner side of the oral cavity.

Advantageous Effects

The present invention provides the following advantageous effects.

First, a temporary digital dental prosthesis is provided which is primarily manufactured on the basis of a scan image of an inner side of an oral cavity and a target dental arch in which a fixture is placed and an opposing dental arch, installed in the oral cavity, and corrected to accurately match each dental arch. Since design information on a final digital dental prosthesis, which is finally manufactured using the temporary digital dental prosthesis, is accurately acquired, it is possible to provide an artificial dental prosthesis having high reliability in terms of occlusion and mastication.

Second, an aligning shape-matching part, which is manufactured on the basis of surface information on the inner side of the oral cavity that is included in a three-dimensional work image so that an area for alignment is secured not only to gums but also to stationary parts around the gums such as the hard palate, can substantially match the shape of and be aligned with the inner side of the oral cavity. Since design information on a final digital dental prosthesis is acquired through a corrected scan image of a temporary digital dental prosthesis that is acquired and corrected in a state in which the aligning shape-matching part matches the shape of and is aligned with the oral cavity, precision in installing the final digital dental prosthesis inside the oral cavity can be significantly improved.

Third, since the aligning shape-matching part can be incised and separated accurately and promptly along a cutting line in which a plurality of connectors and slots are formed on a boundary between a temporary tooth part and the aligning shape-matching part, convenience and reliability in an operation process can be significantly improved.

Fourth, since the aligning shape-matching part is incised and separated along an incision line that is formed to be bent on boundary surfaces of corners of the plurality of connectors configured to connect an edge of the temporary tooth part and the aligning shape-matching part, the accuracy of the acquired corrected scan image and the convenience of using the temporary tooth part can be improved.

MODES OF THE INVENTION

Hereinafter, a digital dental prosthesis and a method of manufacturing the same according to exemplary embodiments of the present invention will be described in detail with reference to the accompanying drawings.

Figure 1:
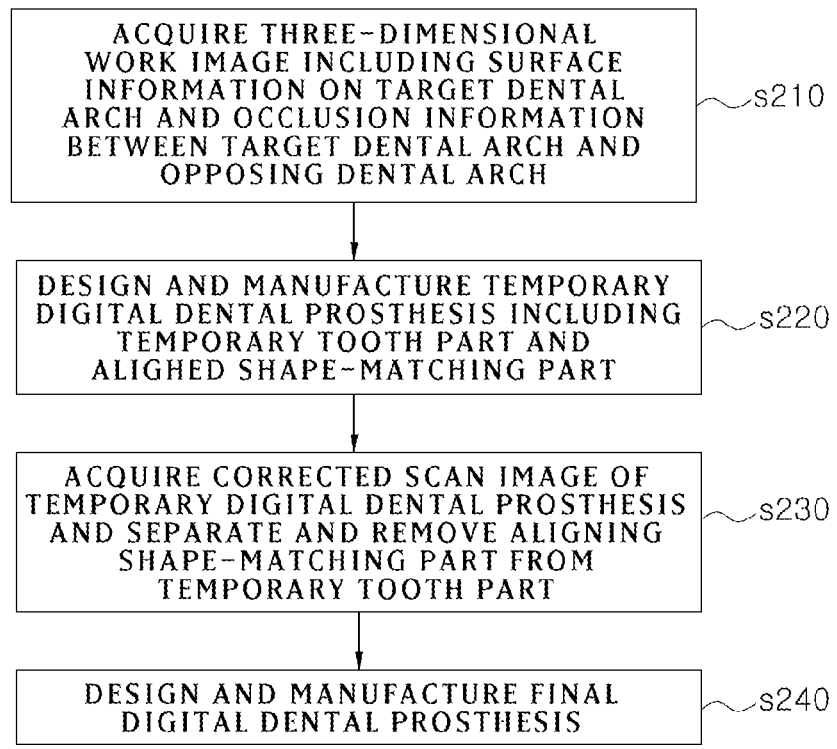
FIG. 1 is a flowchart showing a digital dental prosthesis manufacturing method according to an embodiment of the present invention.
Figure 2:
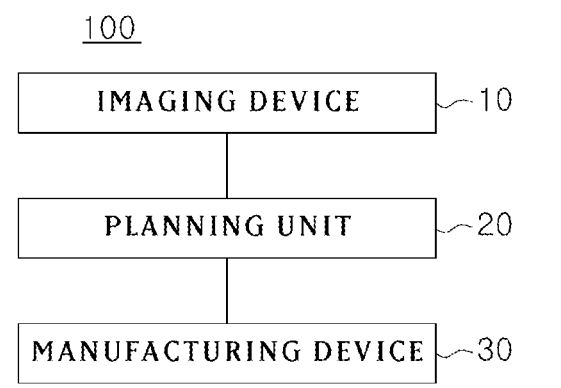
FIG. 2 is a block diagram showing a digital dental prosthesis manufacturing system according to an embodiment of the present invention.

FIG. 1 is a flowchart showing a digital dental prosthesis manufacturing method according to an embodiment of the present invention, and FIG. 2 is a block diagram showing a digital dental prosthesis manufacturing system according to an embodiment of the present invention.

As shown in FIGS. 1 and 2, the digital dental prosthesis manufacturing method according to the present invention includes steps such as acquiring a three-dimensional work image (s210), designing and manufacturing a temporary digital dental prosthesis (s220), acquiring a corrected scan image of the temporary digital dental prosthesis and separating and removing an aligning shape-matching part from a temporary tooth part (s230), and designing and manufacturing a final digital dental prosthesis (s240).

Also, the digital dental prosthesis manufacturing method according to the present invention may be performed using a digital dental prosthesis manufacturing system 100 including an imaging device 10, a planning unit 20, and a manufacturing device 30. Here, the imaging device 10 may be understood as a concept that encompasses an oral scanner and a computerized tomography (CT) imaging machine. Also, the planning unit 20 may be understood as a designing device configured to design the temporary digital dental prosthesis and the final digital dental prosthesis on the basis of image data acquired using the imaging device 10 and pre-stored design information. Further, the manufacturing device 30 may be understood as a three-dimensional printer, a milling machine, or the like by which the temporary digital dental prosthesis and the final digital dental prosthesis designed by the planning unit 20 are three-dimensionally printed or milled to be manufactured as actual objects. Of course, the manufacturing device 30 may also be a mold device prepared corresponding to information on the designed temporary digital dental prosthesis and final digital dental prosthesis.

Meanwhile, in the present embodiment, as an example of the digital dental prosthesis manufacturing method, a process of manufacturing a full dental prosthesis, which is installed inside an oral cavity in which any one of the maxilla or mandible is edentulous or both the maxilla and mandible are edentulous, will be described and illustrated. Of course, the digital dental prosthesis manufacturing method according to the present invention may identically apply to a process of manufacturing a partial dental prosthesis, which is installed inside an oral cavity when some of the maxillary teeth or mandibular teeth are missing (partially edentulous).

Also, the temporary digital dental prosthesis may be understood as a dental prosthesis that is primarily manufactured to acquire precise design information on a final digital dental prosthesis to be finally manufactured, and the final digital dental prosthesis may be understood as an artificial periodontal tissue that is to be substantially used by a subject who requires a dental prosthesis. Here, the temporary digital dental prosthesis and the final digital dental prosthesis may be understood as being designed and manufactured as an integrated dental prosthesis for replacing a denture. Here, since the temporary digital dental prosthesis not only provides design information on the final digital dental prosthesis but also may be used by the subject during the final digital dental prosthesis manufacturing period, the versatility of the temporary digital dental prosthesis and convenience in the process of manufacturing the final digital dental prosthesis may be significantly improved.

Figure 3:
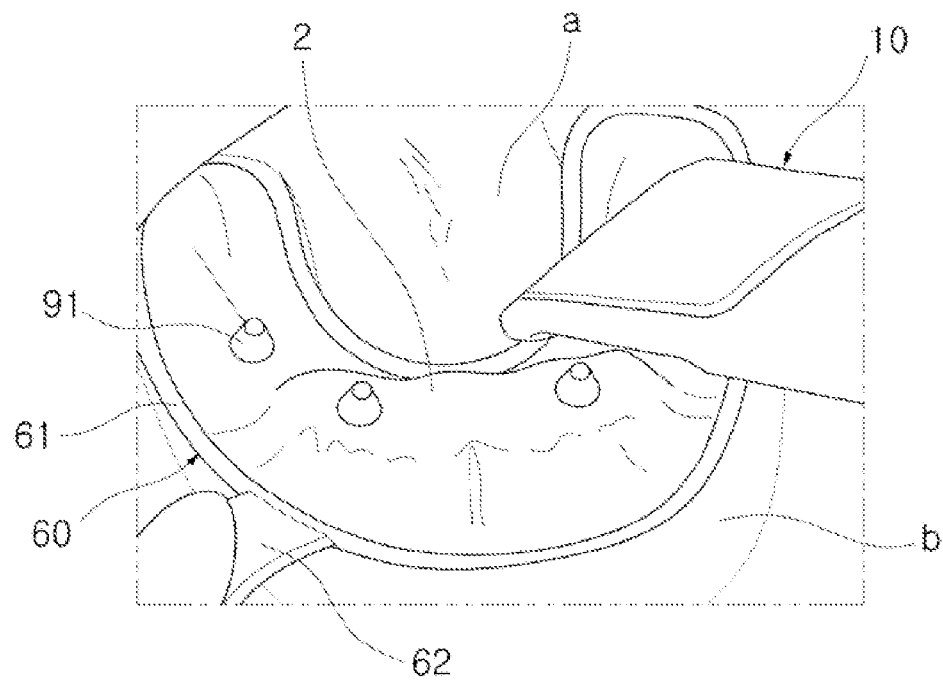
FIG. 3 is an exemplary view illustrating a process of scanning an inner side of an oral cavity in the digital dental prosthesis manufacturing method according to an embodiment of the present invention.
Figure 4A:
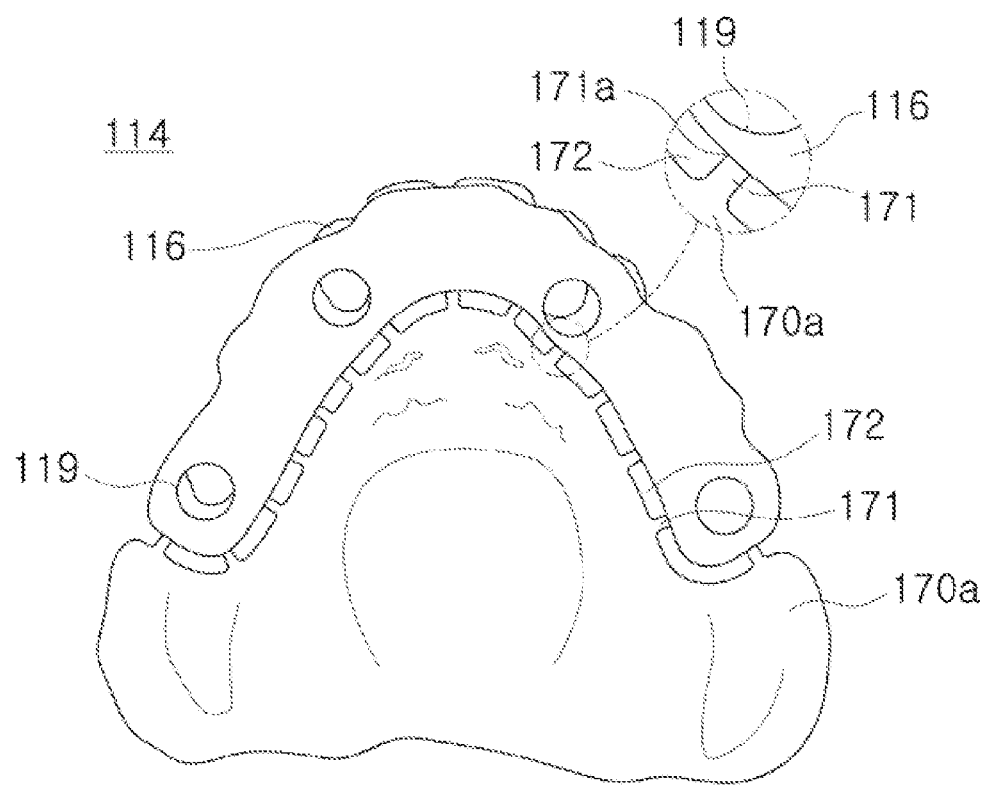
FIGS. 4A and 4B are exemplary views illustrating a temporary digital dental prosthesis, which is applied to the maxilla, of a digital dental prosthesis according to an embodiment of the present invention.
Figure 4B:
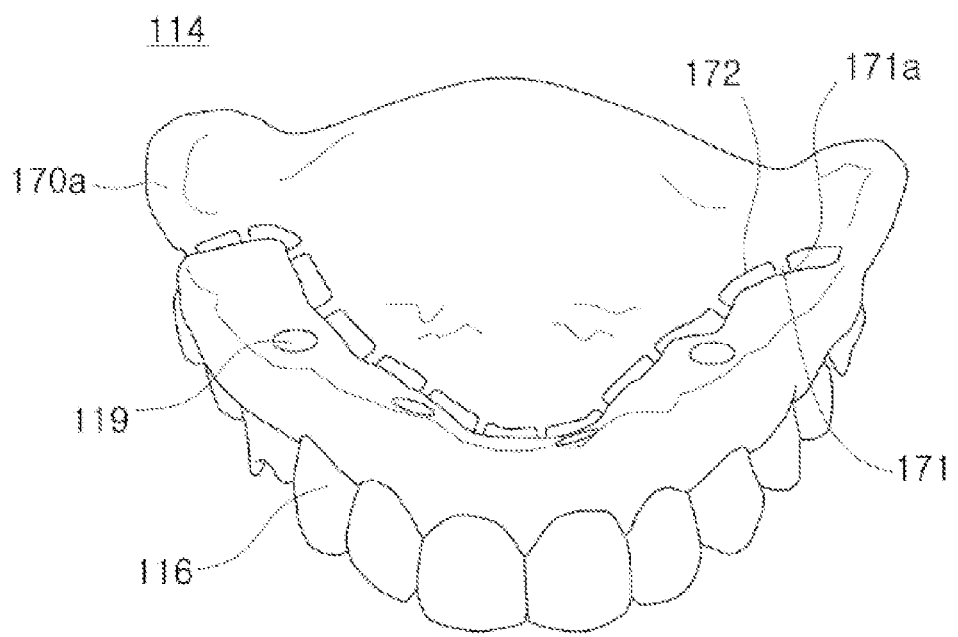
Figure 5:
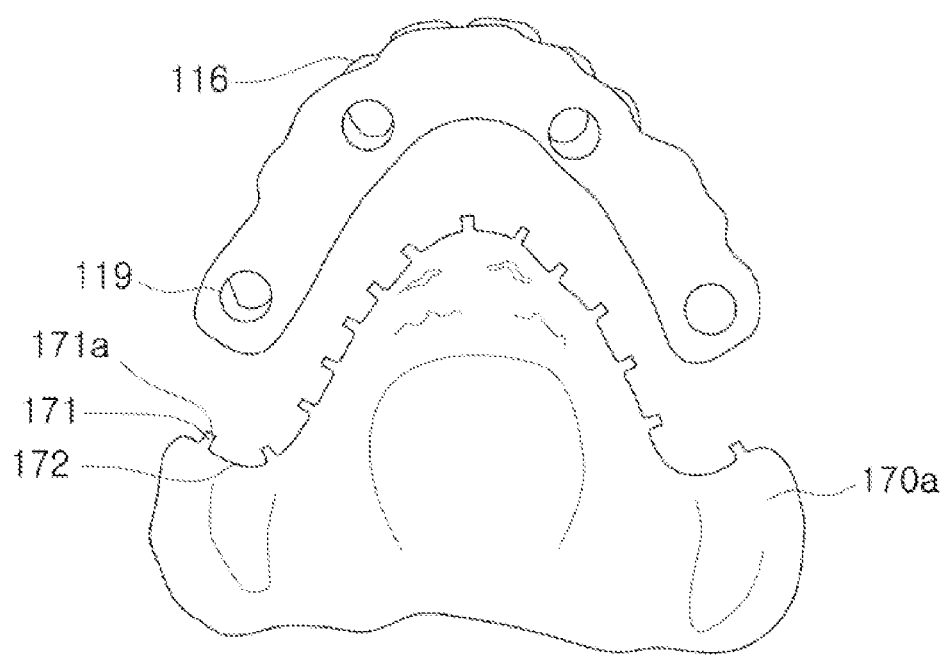
FIG. 5 is an exemplary view illustrating a state in which the temporary digital dental prosthesis applied to the maxilla is separated from the digital dental prosthesis according to an embodiment of the present invention.
Figure 6A:
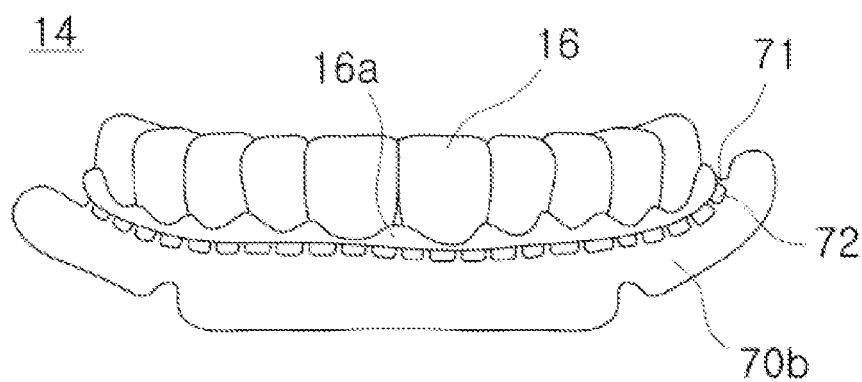
FIGS. 6A, 6B, and 6C are exemplary views illustrating a temporary digital dental prosthesis, which is applied to the mandible, of the digital dental prosthesis according to an embodiment of the present invention.
Figure 6B:
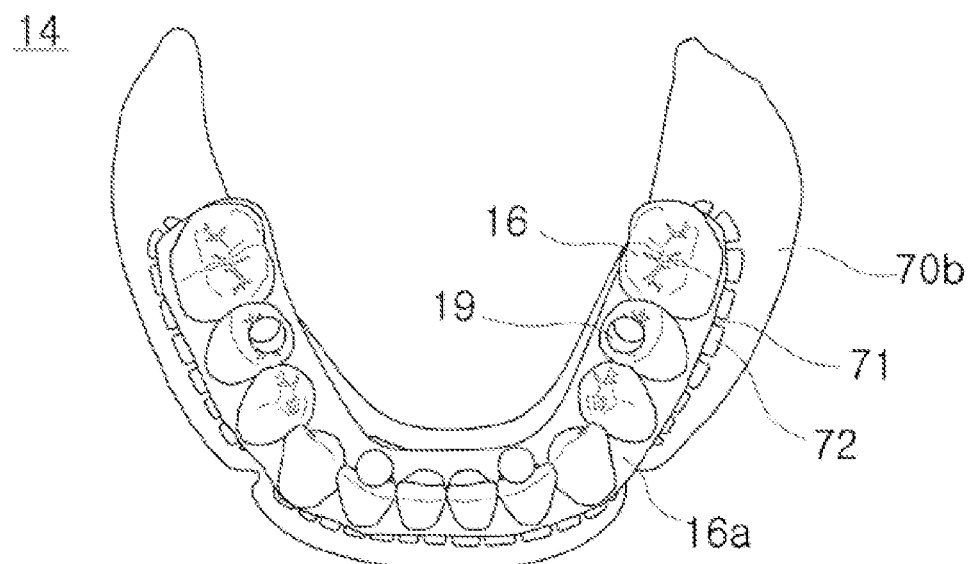
Figure 6C:
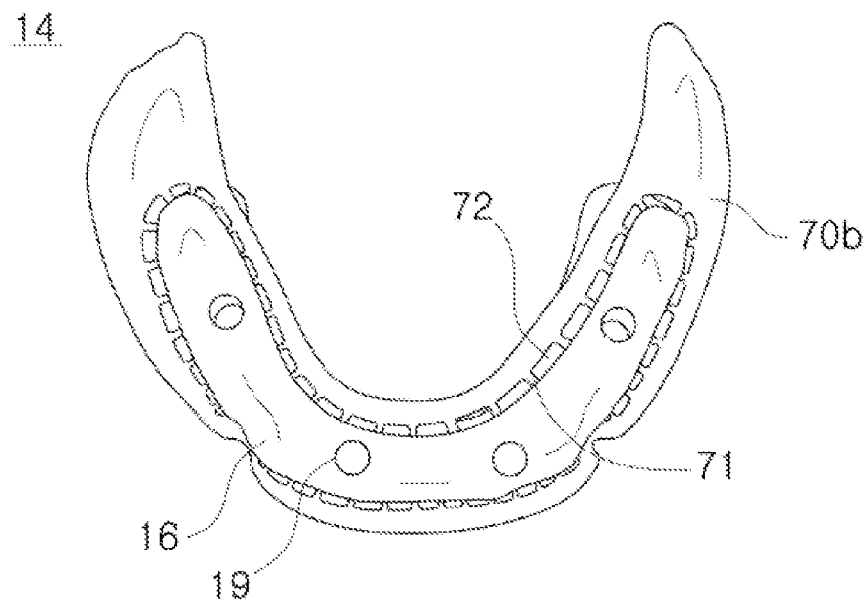
Figure 7:
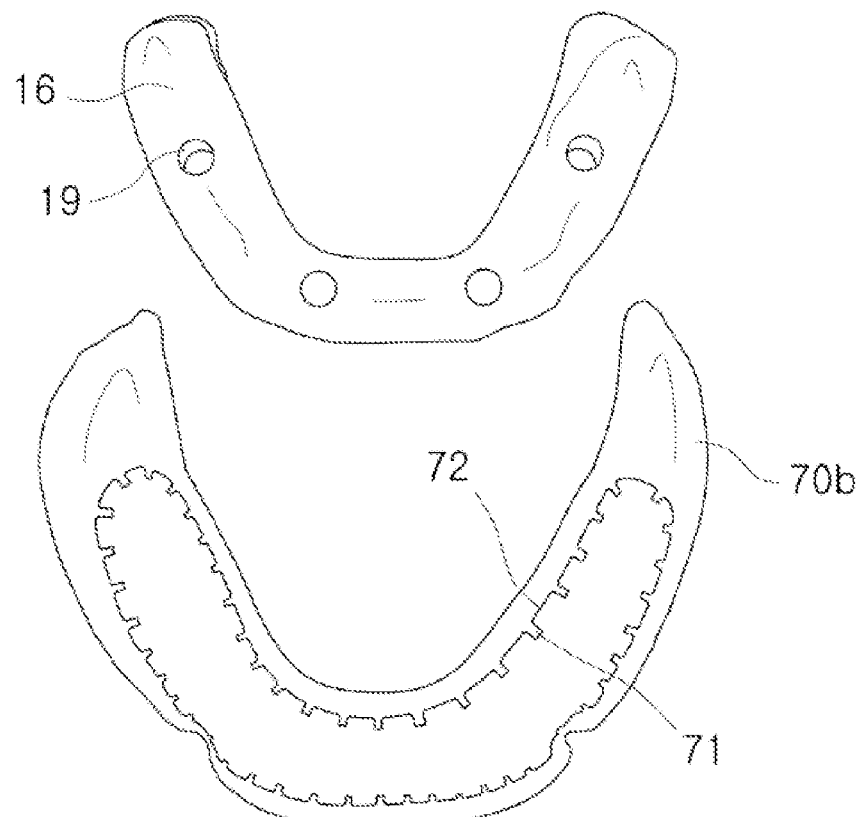
FIG. 7 is an exemplary view illustrating a state in which the temporary digital dental prosthesis applied to the mandible is separated from the digital dental prosthesis according to an embodiment of the present invention.
Figure 9:
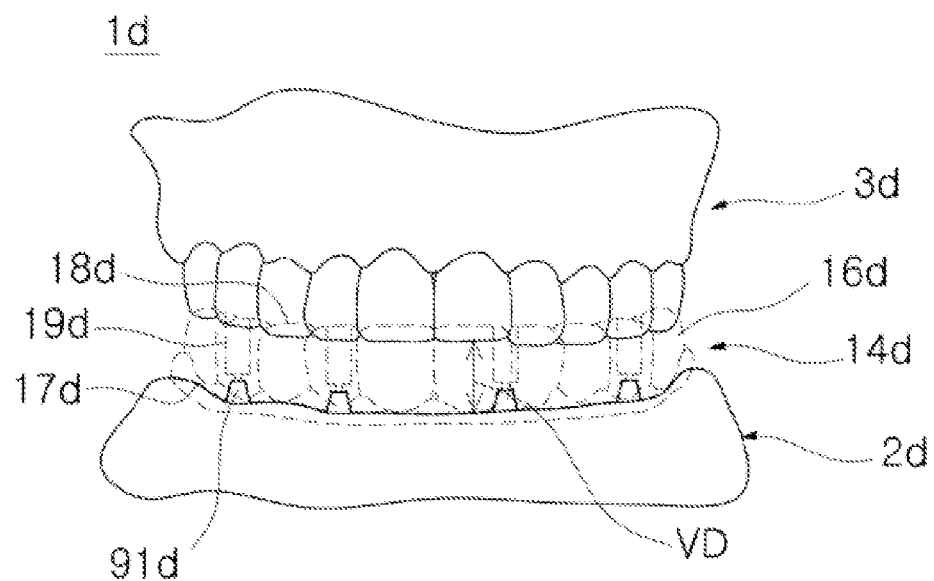
FIG. 9 is an exemplary view illustrating a process of designing a temporary digital dental prosthesis in the digital dental prosthesis manufacturing method according to an embodiment of the present invention.
Figure 10:
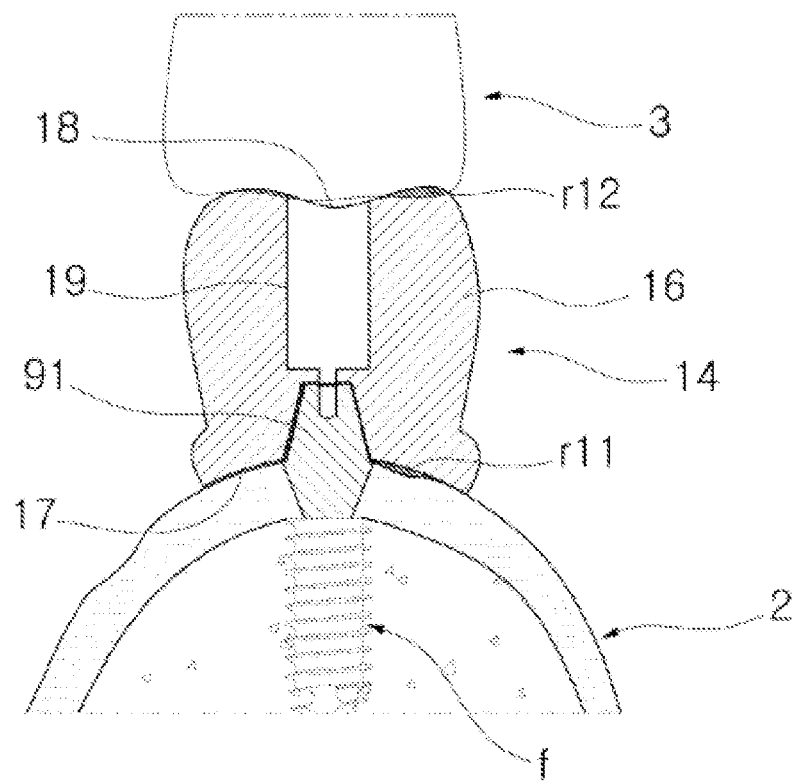
FIG. 10 is an exemplary view illustrating a process of correcting the temporary digital dental prosthesis in the digital dental prosthesis manufacturing method according to an embodiment of the present invention.

FIG. 3 is an exemplary view illustrating a process of scanning an inner side of an oral cavity in the digital dental prosthesis manufacturing method according to an embodiment of the present invention, and FIGS. 4A and 4B are exemplary views illustrating a temporary digital dental prosthesis, which is applied to the maxilla, of a digital dental prosthesis according to an embodiment of the present invention. Also, FIG. 5 is an exemplary view illustrating a state in which the temporary digital dental prosthesis applied to the maxilla is separated from the digital dental prosthesis according to an embodiment of the present invention, and FIGS. 6A, 6B, and 6C are exemplary views illustrating a temporary digital dental prosthesis, which is applied to the mandible, of the digital dental prosthesis according to an embodiment of the present invention. Also, FIG. 7 is an exemplary view illustrating a state in which the temporary digital dental prosthesis applied to the mandible is separated from the digital dental prosthesis according to an embodiment of the present invention, and FIG. 9 is an exemplary view illustrating a process of designing a temporary digital dental prosthesis in the digital dental prosthesis manufacturing method according to an embodiment of the present invention. Also, FIG. 10 is an exemplary view illustrating a process of correcting the temporary digital dental prosthesis in the digital dental prosthesis manufacturing method according to an embodiment of the present invention.

As shown in FIGS. 3 to 7 and 9 and 10, first, a three-dimensional work image 1d, which includes surface information on an inner side of an oral cavity and a target dental arch-side gum part 2 in which fixtures are placed and occlusion information between the target dental arch and the opposing dental arch, is acquired (s210 of FIG. 1).

Here, the target dental arch-side gum part 2 may be understood as a concept that encompasses an alveolar bone of a dental arch in which a dental prosthesis is installed and gums, which are soft tissues surrounding the alveolar bone. Also, being fixed, installed, and placed in the target dental arch or corresponding to the target dental arch may be understood as having the same meaning as being fixed, installed, and placed in the target dental arch-side gum part 2 or corresponding to the target dental arch-side gum part 2. Further, "a perforation is formed in the target dental arch-side gum part 2" may be understood to mean that the perforation is formed in the alveolar bone that is exposed due to cutting the gum open. Also, "a fixture is placed" may be understood to mean that the fixture is placed in the perforation formed in the alveolar bone.

In addition, "surface information," which has been mentioned above and will be mentioned below, may be understood as digital data, such as three-dimensional image data or three-dimensional vector data, of surfaces of each tissue of the oral cavity or components used in the digital dental prosthesis manufacturing method. For example, "surface information" refers to three-dimensional digital data of a gum surface of the target dental arch.

Also, the target dental arch refers to any of the maxillary dental arch or mandibular dental arch of the subject in which a prosthesis is substantially installed. Hereinafter, each of the case in which the target dental arch is the maxillary dental arch and the case in which the target dental arch is the mandibular dental arch will be described and illustrated as an example. In addition, the three-dimensional work image 1d may be understood as digital data in which surface information and internal tissue information of gums/remaining teeth or the like relating to the target dental arch and an opposing dental arch 3, which occludes with the target dental arch, are shown together.

Specifically, the inner side of the oral cavity and the target dental arch-side gum part 2 are scanned using an oral scanner of the imaging device 10 to acquire a target dental arch-side scan image 2d including the target dental arch-related surface information. Also, the opposing dental arch 3 is scanned to acquire an opposing dental arch-side scan image 3d including the opposing dental arch-related surface information. Here, the surface information on the inner side of the oral cavity may include surface information acquired by scanning the parts around the target dental arch-side gum part 2, such as the hard palate. Here, when remaining teeth t are present on the opposing dental arch 3, the opposing dental arch-side scan image 3*d* may include surface information on gums and the remaining teeth t or may only include the surface information on the gums when the opposing dental arch is also edentulous.

Further, a CT image, which includes internal tissue information such as the shape and density of the alveolar bone of the target dental arch and nervous tissues, may be further acquired using the CT imaging machine. Furthermore, the CT image may be acquired in a state in which the target dental arch and the opposing dental arch occlude corresponding to occlusal vertical dimension (VD) that provides mastication sensitivity optimized for the subject who requires a dental prosthesis. For example, a radiolucent occlusion guide means may be disposed between the target dental arch and the opposing dental arch, and the CT image may be acquired in the state in which the target dental arch and the opposing dental arch occlude.

The scan images 2*d* and 3*d* and the CT image may be registered or matched by the planning unit 20 (see FIG. 2) so that the target dental arch-related surface information, the opposing dental arch-related surface information, and the internal tissue information are combined and formed into the three-dimensional work image 1*d*.

Meanwhile, the three-dimensional work image 1*d* may be acquired as the target dental arch-side scan image 2*d* and the opposing dental arch-side scan image 3*d* are disposed to be aligned on the basis of the occlusion information. Also, when the scan images 2*d* and 3*d* disposed to be aligned on the basis of the occlusion information and the CT image are registered, the surface information on the gums which are soft tissues that is difficult to be displayed in the CT image may be displayed through the surface information on the gums that is included in each of the scan images 2*d* and 3*d*.

Further, at the time of acquiring the target dental arch-side scan image 2*d*, a retractor 60 may be used to press and retract soft tissues adjacent to the target dental arch-side gum part 2. Here, the retractor 60 is inserted between at least one side portion of inner and outer side portions of the target dental arch-side gum part 2 and soft tissues adjacent thereto and is disposed inside the oral cavity so that the soft tissues are spaced apart from the target dental arch-side gum part 2. Here, the outer side portion of the gum part may be understood as a portion corresponding to the labial and buccal sides of the oral cavity, and the inner side portion of the gum part may be understood as a portion corresponding to the lingual side of the oral cavity.

In addition, the retractor 60 includes a retraction base part 61, which has an inner surface portion that corresponds to the gum part adjacent to the soft tissues and is snapped and deformed corresponding to a dental arch profile of the target dental arch-side gum part 2, and a grip part 62 provided at one side of the retraction base part 61. Here, in the case of the retractor 60 applied to the mandibular side, tongue a, mouth b, and buccal mucosa, which are retracted in different directions, are pressed and retracted simultaneously toward an outer surface portion of the retraction base part 61, which has an inner surface portion provided to entirely surround the inner and outer side portions of the mandibular gum part. Alternatively, in the case of the retractor applied to the maxillary side, the retraction base part may be provided to surround the outer side portion of the maxillary gum part, and thus, while the mouth and buccal mucosa are pressed and retracted, the outer surface of the hard palate may be clearly exposed without being covered, and scanning may be performed.

Here, when the retraction base part 61 is pressed toward the lower end portion of the target dental arch-side gum part 2 in a state in which the grip part 62 is gripped, the soft tissues are spaced apart from the gum part, and movement of the soft tissues is limited. Then, the oral scanner of the imaging device 10 may be moved along the entirely-exposed outer surface of the target dental arch-side gum part 2, that is, the gum surface, and the target dental arch-side scan image 2*d* including the target dental arch-related surface information may be acquired. Of course, the opposing dental arch-side scan image 3*d* may also be acquired by the above-described method using the retractor 60.

In this way, since, as the soft tissues are spaced apart, the entire outer surface of the target dental arch-side gum part 2 is clearly exposed, the precision and clarity of the surface information may be significantly improved. Also, since the oral scanner of the imaging device 10 is prevented from deviating from a desired scanning path, the scanning task may be performed promptly and stably, and distortion of each of the acquired scan images 2*d* and 3*d* may be minimized.

Further, since the grip part 62 is biased toward one side from a central portion of the retraction base part 61 but extends diagonally outward corresponding to a radius of natural arm movement, the wrist is prevented from being bent excessively at the time of gripping the grip part 62. Also, since a space into which the oral scanner or the like of the imaging device 10 is inserted is secured at maximum at the side opposing the grip part 62, convenience in performing the scanning task may be significantly improved.

Meanwhile, referring to FIGS. 4A to 7 and 9 and 10, a temporary digital dental prosthesis 14 including a temporary tooth part 16 and an aligning shape-matching part 70*b* and a temporary digital dental prosthesis 114 including a temporary tooth part 116 and an aligning shape-matching part 170*a* are designed and manufactured (s220 of FIG. 1). Here, at one side of the temporary tooth parts 16 and 116, a temporary occlusal surface part 18 which occludes with the opposing dental arch is formed on the basis of the occlusion information. Also, at the other side of the temporary tooth parts 16 and 116, a temporary shape-matching surface 17, a shape of which matches a shape of the target dental arch, is formed on the basis of the surface information, and coupling regions 19 and 119 are disposed to be aligned corresponding to arrangement positions of the fixtures. Also, the aligning shape-matching parts 70*b* and 170*a* are integrally connected to edges of the temporary tooth parts 16 and 116 and formed to have a shape that matches the surface information on the inner side of the oral cavity that is included in the three-dimensional work image 1*d*.

In addition, the manufactured temporary digital dental prostheses 14 and 114 are installed on the target dental arch, and a corrected scan image 1*f* of the temporary digital dental prostheses 14 and 114, in which the temporary shape-matching surface 17 and the coupling regions 19 and 119 are corrected, is acquired. Here, the corrected scan image 1*f* includes surface information on the temporary digital dental prostheses 14 and 114 in which the temporary shape-matching surface and the coupling regions are corrected. Of course, the corrected scan image 1*f* may include surface information on the temporary digital dental prostheses 14 and 114 in which the temporary occlusal surface part, which occludes with the opposing dental arch, is corrected.

That is, the corrected scan image 1f includes pieces of surface information on the corrected temporary shape-matching surface, the corrected coupling regions within an inner surface profile set according to the surface information on the corrected temporary shape-matching surface, and the corrected temporary occlusal surface part.

Also, the aligning shape-matching parts 70b and 170a are cut to be separated and removed from the temporary tooth parts 16 and 116 (s230 of FIG. 1). Here, the position and angle of the coupling regions 19 and 119 may be set corresponding to an outer surface profile of a virtually-arranged dental prosthesis so that the coupling regions 19 and 119 are coupled to the fixtures. Here, the dental prosthesis may be understood as including an abutment and a support cylinder which are selectively coupled to a fastening groove of the fixture.

In addition, the occlusion information may further include three-dimensional masticatory surface information and arrangement information on remaining teeth included at the opposing dental arch side in addition to including the occlusal vertical dimension (VD). Therefore, a profile of a temporary occlusal surface part 18d, which occludes with the opposing dental arch, may be set on the basis of the occlusion information. Here, when the opposing dental arch is also edentulous, the profile of the temporary occlusal surface part 18d may also be set on the basis of predetermined standard teeth arrangement information. Here, the standard teeth arrangement information may be understood as information in which digital data corresponding to each tooth constitutes a set with a predetermined dental arch line corresponding thereto. As the standard teeth arrangement information, standardized average values may be calculated and set as options for dental arch lines, occlusal vertical dimension (VD), and positions of teeth by gender and age, and a single piece of standard teeth arrangement information that corresponds to the subject may be selected and virtually arranged in the three-dimensional work image 1d.

Also, the surface information is included in the target dental arch-side scan image 2d which is acquired by scanning the target dental arch-side gum part 2 in which the fixtures are placed. Here, the surface information may be displayed as digital data relating to a profile of a coupling part 91d of the abutment or the target dental arch-side gum surface in which the support cylinder is included. In addition, the surface information is used as design information for a temporary shape-matching surface 17d, a shape of which matches a shape of the target dental arch-side gum part 2 in which the fixtures are placed.

Meanwhile, coupling parts of the temporary digital dental prosthesis, temporary tooth part, temporary shape-matching surface, temporary occlusal surface part, coupling region, and abutment, which are denoted by reference numerals 14d, 16d, 17d, 18d, 19d, and 91e, may be understood as digital data displayed on the three-dimensional work image 1d. In addition, coupling parts of the temporary digital dental prosthesis, temporary tooth part, temporary shape-matching surface, temporary occlusal surface part, coupling region, and abutment, which are denoted by reference numerals 14, 16, 17, 18, 19, and 91, may be understood as portions of the temporary digital dental prosthesis that are manufactured or provided as an actual object.

Here, a gap between the profile of the temporary shape-matching surface 17d and the profile of the temporary occlusal surface part 18d may be set on the basis of the occlusal vertical dimension (VD). Therefore, when the manufactured temporary digital dental prostheses 14 and 114 are installed on the target dental arch-side gum part 2, since the reliability is improved in terms of occlusion with the opposing dental arch 3 and mastication, the subject's satisfaction with use may be significantly improved. Also, the precision in designing the final digital dental prosthesis, which is designed and manufactured on the basis of an image acquired by correcting the manufactured temporary digital dental prostheses 14 and 114, may be significantly improved.

Meanwhile, the coupling region 19d, which extends toward the temporary occlusal surface part 18d corresponding to the arrangement positions of the fixtures, may be disposed to be aligned at the temporary shape-matching surface 17d side. Here, the coupling region 19d may be understood as a portion where the temporary digital dental prostheses 14 and 114 are fixed to the fixtures placed in the target dental arch when the temporary digital dental prostheses 14 and 114 are installed on the target dental arch-side gum part 2. Also, "the abutment or support cylinder is placed in the target dental arch" may be understood to mean that a lower end of the abutment or support cylinder is fixed to a fastening groove formed in an upper end portion of the fixture.

Here, the coupling region 19d may be virtually arranged to overlap the temporary digital dental prosthesis 14d corresponding to a position where the fixture is placed, and the support cylinder may be disposed to be aligned with the coupling region 19d and set instead of the coupling region 19d. Here, the support cylinder is a component for joining the temporary digital dental prosthesis and the abutment. In the present invention, the support cylinder may be understood as digital data relating to the actual support cylinder. That is, a coupling end portion formed at one end portion of the support cylinder may be disposed to be aligned with one side end portion of the coupling region 19d. Therefore, the coupling region 19d may be corrected to a shape of an inner circumferential surface of the support cylinder to which a fastening screw is fastened so that the temporary digital dental prosthesis may be fixed to the abutment.

Here, the manufactured temporary digital dental prostheses 14 and 114 may be integrally formed with the temporary tooth parts 16 and 116 in which the temporary shape-matching surface 17 and the temporary occlusal surface part 18 are formed. Here, a temporary gum part 16a provided corresponding to the shape and color of gums may be integrally formed with the temporary tooth parts 16 and 116. Also, in the design process, the coupling region 19d may be set to entirely pass through the temporary digital dental prosthesis 14d.

In addition, while being applicable inside the oral cavity, the temporary digital dental prostheses 14 and 114 may have a predetermined strength so that deformation during mastication is minimized and may be formed of a synthetic resin material that may be cut using a cutting tool. Therefore, in the process of correcting the temporary digital dental prostheses 14 and 114 that will be described below, the temporary digital dental prostheses 14 and 114 may be easily cut and corrected so that the precision in occlusion/shape-matching with the inner side of the actual oral cavity and the placed fixtures is maximized.

Also, since the temporary tooth parts 16 and 116 are integrally manufactured with the temporary digital dental prostheses 14 and 114 and the number of manufacturing workers and the manufacturing period are reduced, the manufacturing convenience may be significantly improved. The temporary tooth parts 16 and 116, in which one side end portions of the coupling regions 19 and 119 and the temporary occlusal surface part 18 are formed in the temporary shape-matching surface 17, may be integrally three-dimensionally printed and manufactured with the temporary digital dental prostheses 14 and 114 using a three-dimensional printer. Alternatively, the temporary tooth parts 16 and 116 may be integrally manufactured with the temporary digital dental prostheses 14 and 114 by using a milling machine or a mold device.

Further, since the temporary digital dental prosthesis 14d is based on each of the scan images 2d and 3d acquired by directly scanning the inner side of the oral cavity, the temporary digital dental prosthesis 14d may be easily designed, and the extent to which the temporary digital dental prosthesis 14d matches the inner side of the oral cavity may be significantly improved. Therefore, the accuracy of the final digital dental prosthesis, which is manufactured on the basis of an image acquired by correcting the manufactured temporary digital dental prostheses 14 and 114, is also significantly improved, and thus the subject's satisfaction with mastication or occlusion after installing the final digital dental prosthesis may be significantly improved.

Meanwhile, referring to FIGS. 4A to 7, the aligning shape-matching parts 70b and 170a integrally extend from boundary surfaces of edges of the temporary tooth parts 16 and 116. Here, the aligning shape-matching parts 70b and 170a may be formed to be curved corresponding to the shape of the inner side of the oral cavity on the basis of the surface information on the inner side of the oral cavity. Here, the aligning shape-matching parts 70b and 170a may be integrally three-dimensionally printed and manufactured with the temporary tooth parts 16 and 116 using the three-dimensional printer. Alternatively, the aligning shape-matching parts 70b and 170a may be integrally manufactured with the temporary tooth parts 16 and 116 by using the milling machine or mold device. Here, the aligning shape-matching parts 70b and 170a may be designed and manufactured corresponding to the shape of the inner side of the oral cavity according to each of the case in which the target dental arch is the maxillary dental arch and the case in which the target dental arch is the mandibular dental arch.

Further, since the aligning shape-matching parts 70b and 170a are based on each of the scan images 2d and 3d acquired by directly scanning the inner side of the oral cavity, the aligning shape-matching parts 70b and 170a may be easily designed, and the extent to which the aligning shape-matching parts 70b and 170a match the inner side of the oral cavity may be significantly improved. Therefore, the accuracy of the final digital dental prosthesis, which is manufactured on the basis of an image acquired by correcting the manufactured temporary digital dental prostheses 14 and 114, is also significantly improved, and thus the subject's satisfaction with mastication or occlusion after installing the final digital dental prosthesis may be significantly improved.

In addition, cutting lines 71 and 171 are set along the boundaries of the temporary tooth parts 16 and 116, which are adjacent to the temporary shape-matching surface 17, and the aligning shape-matching parts 70b and 170a. Here, a plurality of slots 72 and 172 may be formed at predetermined intervals along the cutting lines 71 and 171. Here, the cutting lines 71 and 171 may be set on a boundary surface between the temporary tooth parts 16 and 116 and the aligning shape-matching parts 70b and 170a and so that cutting may be selectively performed. Also, since the slots 72 and 172 are formed along the edges of the temporary tooth parts 16 and 116 and through-spaces are formed along the cutting lines 71 and 171, the temporary tooth parts 16 and 116 and the aligning shape-matching parts 70b and 170a may be easily separated. Of course, according to circumstances, the slots 72 and 172 may not be formed along the cutting lines 71 and 171. Such a case also falls within the scope of the present invention.

In addition, a plurality of connectors configured to connect the aligning shape-matching parts 70b and 170a to the edges of the temporary tooth parts 16 and 116, which are adjacent to the temporary shape-matching surface 17, may be formed. Also, an incision line 171a may be formed to be bent on boundary surfaces between the connectors and corners of the temporary tooth parts 16 and 116. Specifically, the incision line 171a may be formed as each connector on the cutting lines 71 and 171 is bent with respect to the temporary tooth parts 16 and 116. Further, a guiding line formed to be recessed radially inward from the connector and configured to guide an incision may be further provided on the incision line 171a. Here, a thickness of the connector may be formed to be smaller than a thickness of the aligning shape-matching parts 70b and 170a.

Here, the aligning shape-matching parts 70b and 170a are incised and separated along the incision line 171a formed to be bent on boundary surfaces of corners of the plurality of connectors configured to connect the aligning shape-matching parts 70b and 170a and the edges of the temporary tooth parts 16 and 116. Therefore, the accuracy of the acquired corrected scan image 1f and the convenience of using the temporary tooth parts 16 and 116 may be improved.

Accordingly, the aligning shape-matching parts 70b and 170a may be incised and separated along the cutting lines 71 and 171 along which the connectors and the slots 72 and 172 are formed on the boundary between the temporary tooth parts 16 and 116 and the aligning shape-matching parts 70b and 170a. Therefore, the convenience and reliability in the operation process may be significantly improved. Further, since the temporary digital dental prostheses 14 and 114 may be used in reality even when there is no prosthesis in use, the versatility of the temporary digital dental prostheses 14 and 114 and convenience in the operation process may be significantly improved.

Meanwhile, the surface information on the inner side of the oral cavity that is included in the three-dimensional work image 1d may include a shape profile of stationary parts around the temporary shape-matching surface 17. Here, the shape profile of the stationary parts around the temporary shape-matching surface 17 may be understood as including an alveolar bone of a dental arch around the temporary shape-matching surface 17. In addition, in the case in which the target dental arch is the maxillary dental arch, the shape profile of the stationary parts around the temporary shape-matching surface 17 may include an inner surface profile of the hard palate which is at the maxillary side. Also, in the case in which the target dental arch is the mandibular dental arch, the shape profile of the stationary parts around the temporary shape-matching surface 17 may include inner surface and outer surface profiles of a target gum part.

Referring to FIGS. 4A and 4B, in the case in which the target dental arch is the maxillary dental arch, the aligning shape-matching part 170a may integrally extend from a boundary surface of an inner surface-side edge of the temporary tooth part 116. Specifically, in the case in which the target dental arch is the maxillary dental arch, the aligning shape-matching part 170a may be connected to the cutting line 171 which is integrally connected from the temporary tooth part 116 adjacent to the temporary shape-matching surface of the temporary digital dental prosthesis 114 that is disposed on the maxillary dental arch. Here, the inner surface-side of the temporary tooth part 116 may be understood as a portion corresponding to the hard palate inside the oral cavity. Of course, according to circumstances, the aligning shape-matching part 170a may also be formed to integrally extend while surrounding the entire inner surface-side and the outer surface-side so as to include a boundary surface of an outer surface-side edge of the temporary tooth part 116. Here, the outer surface-side of the temporary tooth part 116 may be understood as a portion corresponding to the labial and buccal inner surface-side.

Here, the three-dimensional work image 1d may include a maxillary-side scan image which is acquired by scanning the maxillary dental arch and hard palate. Accordingly, the aligning shape-matching part 170a may be designed on the basis of the maxillary-side scan image so that the shape of the aligning shape-matching part 170a matches that of the inner surface profile of the hard palate. Therefore, since an accurate placement position may be guided as the aligning shape-matching part 170a is provided to correspond to the shapes of the parts around the maxillary-side target dental arch and hard palate and be disposed inside the oral cavity, the reliability of a dental implant placement plan may be significantly improved.

Referring to FIGS. 6A, 6B, and 6C, in the case in which the target dental arch is the mandibular dental arch, the shape profile of the stationary parts around the temporary shape-matching surface 17 may include the inner surface and outer surface profiles of a target gum part. That is, the aligning shape-matching part 70b may integrally extend from boundary surfaces of edges of the inner surface and outer surface of the temporary tooth part 16. Here, the outer surface of the target gum part may be understood as a portion corresponding to the labial and buccal inner surface-side, and the inner surface of the target gum part may be understood as a portion corresponding to a lingual root-side inside the oral cavity.

Here, the three-dimensional work image 1d may include a mandibular-side scan image which is acquired by scanning the mandibular dental arch. Accordingly, the aligning shape-matching part 70b may be designed on the basis of the mandibular-side scan image so that the shape of the aligning shape-matching part 70b matches those of the inner surface and outer surface of the target gum part. Therefore, since an accurate placement position may be guided as the aligning shape-matching part 70b is provided to correspond to the shapes of the parts around the mandibular-side target dental arch and disposed inside the oral cavity, the reliability of a dental implant placement plan may be significantly improved. That is, while the temporary digital dental prostheses 14 and 114 are inserted into the oral cavity, the shapes of the aligning shape-matching parts 70b and 170a match the shape of the inner side of the oral cavity so that an accurate placement position may be guided.

Accordingly, the aligning shape-matching parts 70b and 170a, which are manufactured on the basis of the surface information on the inner side of the oral cavity that is included in the three-dimensional work image 1d so that an area for alignment is secured not only to gums but also to stationary parts around the gums such as the hard palate, are formed. In addition, the corrected scan image 1f of the temporary digital dental prostheses is acquired as the temporary digital dental prostheses 14 and 114, in which the aligning shape-matching parts 70b and 170a are formed, substantially match the shape of the inner side of the oral cavity, are aligned with the inner side of the oral cavity, and are inserted inside the oral cavity. In this way, since design information on the final digital dental prosthesis is acquired using the acquired corrected scan image 1f, the precision in installing the final digital dental prosthesis inside the oral cavity may be significantly improved.

Figure 8:
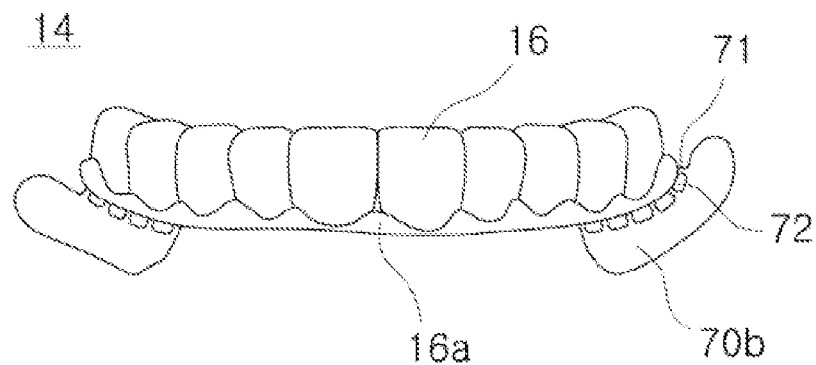
FIG. 8 is an exemplary view illustrating a temporary digital dental prosthesis, which is applied to the mandible, of the digital dental prosthesis according to another embodiment of the present invention.

Meanwhile, FIG. 8 is an exemplary view illustrating a temporary digital dental prosthesis, which is applied to the mandible, of the digital dental prosthesis according to another embodiment of the present invention. In the present embodiment, basic configurations other than the shape of an aligning shape-matching part 70c are the same as in the above-described embodiment, and thus detailed descriptions of the same configurations will be omitted.

Referring to FIG. 8, in the case in which the target dental arch is the mandibular dental arch, the shape profile of the stationary parts around the temporary shape-matching surface 17 may include profiles of one side of an inner surface and one side of an outer surface of a target gum part. That is, the aligning shape-matching part 70c may integrally extend from boundary surfaces of edges of one side of the inner surface and one side of the outer surface of the temporary tooth part 16. Here, the outer surface of the target gum part may be understood as a portion corresponding to the labial and buccal inner surface-side, and the inner surface of the target gum part may be understood as a portion corresponding to a lingual root-side inside the oral cavity. Also, the one side of the outer surface of the target gum part may be understood as including some of the molar teeth.

Specifically, the aligning shape-matching part 70c of a temporary digital dental prosthesis 14b may be formed to, while extending from the inner surface of the temporary tooth part 16, extend the outer surfaces at both sides of the temporary tooth part 16 which correspond to the molar teeth sides. Accordingly, the aligning shape-matching part 70c may cause the outer surface at the central side of the temporary tooth part 16, which corresponds to the front teeth side, to be exposed.

Here, the three-dimensional work image 1d may include a mandibular-side scan image which is acquired by scanning the mandibular dental arch. Accordingly, the aligning shape-matching part 70c may be designed on the basis of the mandibular-side scan image so that the shape of the aligning shape-matching part 70c matches those of the inner surface and outer surface of the target gum part. Therefore, since an accurate placement position may be guided as the aligning shape-matching part 70c is provided to correspond to the shapes of the parts around the mandibular-side target dental arch and disposed inside the oral cavity, the reliability of a dental implant placement plan may be significantly improved. That is, while the temporary digital dental prosthesis 14b is inserted into the oral cavity, the shape of the aligning shape-matching part 70c matches the shape of the inner side of the oral cavity so that an accurate placement position may be guided.

Accordingly, the aligning shape-matching part 70c, which is manufactured on the basis of the surface information on the inner side of the oral cavity that is included in the three-dimensional work image 1d so that an area for alignment is secured not only to gums but also to stationary parts around the gums such as the hard palate, is formed. In addition, the corrected scan image 1f of the temporary digital dental prosthesis is acquired as the temporary digital dental prosthesis 14b, in which the aligning shape-matching part 70c is formed, substantially matches the shape of the inner side of the oral cavity, is aligned with the inner side of the oral cavity, and is inserted inside the oral cavity. In this way, since design information on the final digital dental prosthesis is acquired using the acquired corrected scan image 1f, the precision in installing the final digital dental prosthesis inside the oral cavity may be significantly improved.

Meanwhile, the three-dimensional work image 1d may be acquired to include the surface information and internal tissue information relating to the opposing dental arch, and the surface information may be corrected while designing the temporary digital dental prostheses 14 and 114. Specifically, while acquiring the three-dimensional work image 1d, virtual fixtures corresponding to the fixtures may be virtually arranged on the surface information according to the placement guidance information.

Here, the profile of the coupling part 91d of the abutment and a virtual support cylinder, which are displayed in the surface information, may be matched with the virtual fixtures virtually arranged on the surface information. Therefore, the target dental arch-side scan image 2d may be disposed to be aligned with the three-dimensional work image 1d. That is, instead of gums made of tissue with high fluidity, the coupling part of the abutment and the support cylinder, which are made of a rigid material, and the virtual abutment and virtual support cylinder are set as a reference for matching between the scan images. Accordingly, the target dental arch-side scan image 2d may be aligned corresponding to an accurate occlusal vertical dimension (VD).

In addition, as the surface information is erased, the three-dimensional work image 1d is corrected by replacing the surface information. Accordingly, the surface information relating to the opposing dental arch and digital data relating to a target dental arch-side gum surface, from which the coupling part of the abutment and the virtual support cylinder protrude, may be displayed on the three-dimensional work image 1d. Therefore, the temporary digital dental prosthesis 14d may be precisely designed on the basis of the three-dimensional work image 1d, which is corrected by replacing the surface information.

Meanwhile, when the manufactured temporary digital dental prostheses 14 and 114 are installed inside the oral cavity and occlude with the opposing dental arch 3, due to a pressure caused by the occlusion, profiles of the temporary shape-matching surface 17 and the temporary occlusal surface part 18 are corrected to correspond to an outer surface profile of each of the target dental arch-side gum part 2 and the opposing dental arch 3.

Specifically, a curing resin may be applied on one side of the temporary shape-matching surface 17 and one side of the coupling regions 19 and 119, and the temporary shape-matching surface 17 and the coupling regions 19 and 119 may be installed on the target dental arch-side gum part 2, from which a coupling part 91 of the abutment or the support cylinder protrude. In addition, when the curing resin is pressed due to the pressure caused by the occlusion, a void between the one side of the coupling regions 19 and 119, the coupling part 91 of the abutment, and the support cylinder may be filled with the curing resin. Also, a void between the temporary shape-matching surface 17 and the target dental arch-side gum part 2 may be filled with the curing resin. Then, as the curing resin is cured and fixed, the profiles of the temporary shape-matching surface 17 and the coupling regions 19 and 119 may be corrected to include a shape-matching correction surface part r11 which is formed by the curing resin.

Here, the void of the coupling regions 19 and 119 may be filled with the curing resin while the aligning shape-matching parts 70b and 170a, which are manufactured on the basis of the surface information on the inner side of the oral cavity that is included in the three-dimensional work image 1d, match the shape of the inner side of the oral cavity, are aligned with the inner side of the oral cavity, and are inserted inside the oral cavity. Also, the temporary occlusal surface part 18 may be cut on the basis of a mastication mark of the remaining teeth on the opposing dental arch 3, which is formed due to the pressure caused by the occlusion, and adjusted to be optimized according to mastication sensitivity of the subject. In addition, the temporary digital dental prosthesis corrected using the curing resin may be separated from the inner side of the oral cavity. In this way, the profile of the temporary occlusal surface part 18 may be corrected to include an occlusion correction surface part r12 which matches a masticatory surface of the remaining teeth on the opposing dental arch 3.

In addition, when the entire outer surfaces of the corrected temporary digital dental prostheses 14 and 114 are scanned using the imaging device 10 (see FIG. 2), an image of the shape-matching correction surface part r11 and the occlusion correction surface part r12 may be acquired, and the corrected scan image 1f (see FIG. 11A) may be generated. Here, referring to FIGS. 5 to 7, the corrected scan image 1f (see FIG. 11A) may be generated in a state in which the aligning shape-matching parts 70b and 170a are incised so as to be separated and removed from the temporary tooth parts 16 and 116. Of course, according to circumstances, the corrected scan image 1f (see FIG. 11A) may also be generated in a state in which the temporary tooth parts 16 and 116 and the aligning shape-matching parts 70b and 170a are integrally connected.

Therefore, according to the present invention, the temporary digital dental prostheses 14 and 114, which are primarily manufactured on the basis of the occlusion information and the target dental arch-side scan image 2d, are installed inside the oral cavity in reality and corrected to accurately match each dental arch. Accordingly, the reliability of design information on the final digital dental prosthesis, which is finally manufactured on the basis of the corrected scan image 1f (see FIG. 11A) acquired by scanning the temporary digital dental prostheses 14 and 114 which are corrected as described above, may be significantly improved. Also, even when there is no prosthesis being used by the subject, the corrected temporary digital dental prostheses 14 and 114 may be used in reality in addition to being used temporarily during the final digital dental prosthesis manufacturing period. Therefore, since dual functions, including acquiring design information and being used temporarily, are provided through a single temporary digital dental prosthesis, the versatility and economic feasibility of the temporary digital dental prosthesis may be significantly improved.

Further, when the manufactured temporary digital dental prostheses 14 and 114 are installed inside the oral cavity and occlude therewith while the curing resin is applied on the one side of the temporary shape-matching surface 17 and the one side of the coupling regions 19 and 119, the temporary digital dental prostheses 14 and 114 are precisely corrected according to optimal mastication sensitivity directly perceived by the subject. Therefore, the precision in installing the final digital dental prosthesis, which is designed and manufactured on the basis of the surface information on the corrected temporary digital dental prostheses, inside the oral cavity may be significantly improved.

Also, the temporary digital dental prostheses 14 and 114 are primarily manufactured on the basis of scan images of the inner side of the oral cavity, in which the fixtures are placed, the target dental arch, and the opposing dental arch and are installed inside the oral cavity and corrected to accurately match each dental arch. In this way, since design information on the final digital dental prosthesis, which is finally manufactured, is accurately acquired, it is possible to provide an artificial dental prosthesis having high reliability in terms of occlusion and mastication.

Figure 11A:
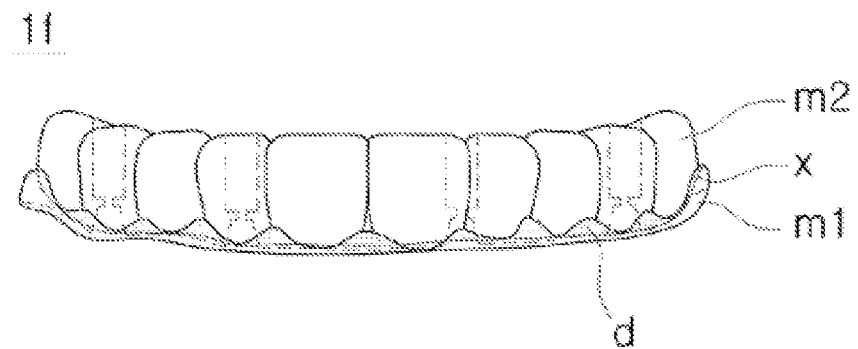
FIGS. 11A and 11B are exemplary views illustrating a process of designing a final digital dental prosthesis in the digital dental prosthesis manufacturing method according to an embodiment of the present invention.
Figure 11B:
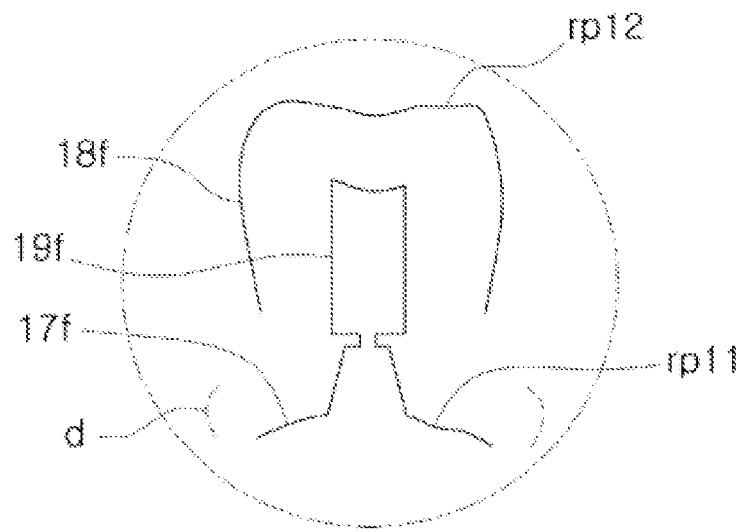
Figure 12:
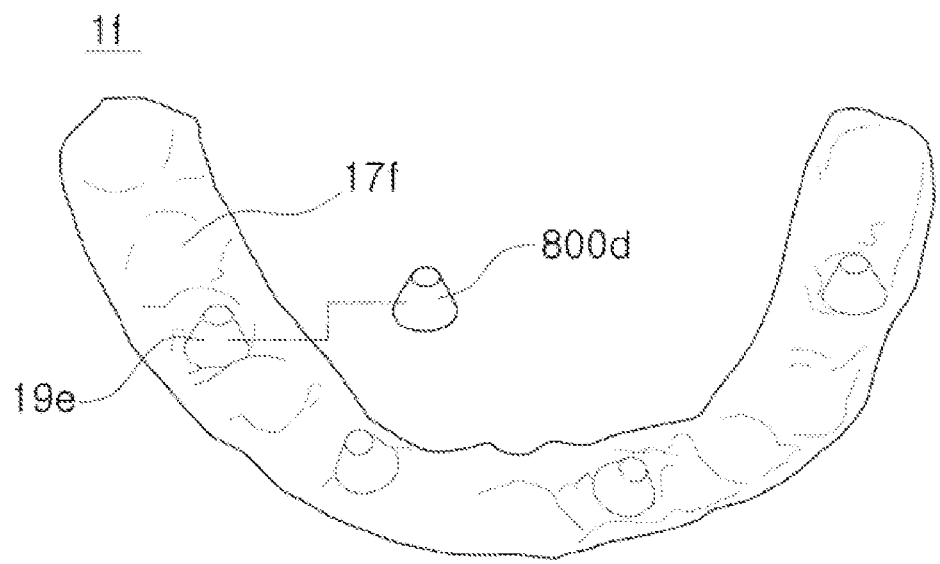
FIG. 12 is an exemplary view illustrating a process in which design information on a coupling region is replaced in the digital dental prosthesis manufacturing method according to an embodiment of the present invention.
Figure 13:
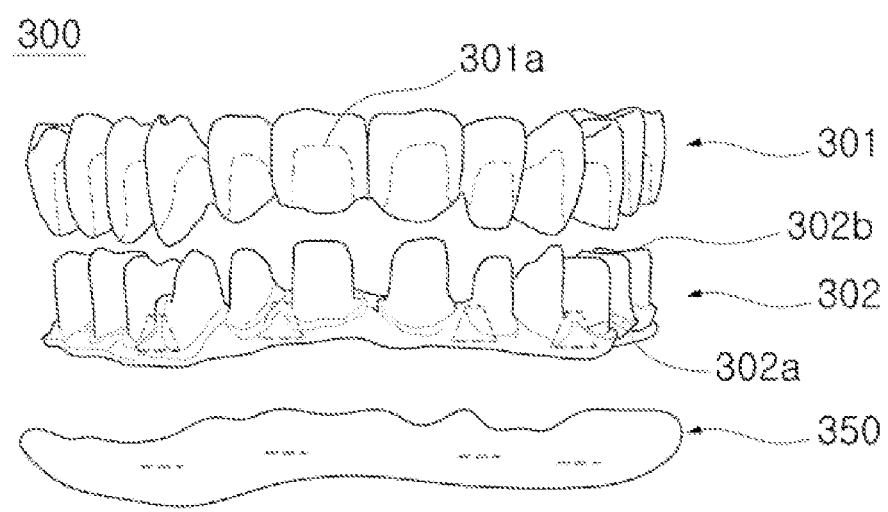
FIG. 13 is an exploded perspective view of the final digital dental prosthesis manufactured according to an embodiment of the present invention.

FIGS. 11A and 11B are exemplary views illustrating a process of designing a final digital dental prosthesis in the digital dental prosthesis manufacturing method according to an embodiment of the present invention, and FIG. 12 is an exemplary view illustrating a process in which design information on a coupling region is replaced in the digital dental prosthesis manufacturing method according to an embodiment of the present invention. Also, FIG. 13 is an exploded perspective view of the final digital dental prosthesis manufactured according to an embodiment of the present invention.

As shown in FIGS. 11A to 13, a virtual coupling groove is formed corresponding to the position and shape of a coupling region 19f within an inner surface profile set according to surface information 17f on the corrected temporary shape-matching surface. Also, an occlusal surface part is set according to surface information 18f on the corrected temporary occlusal surface part, and the final digital dental prosthesis is designed and manufactured (s240 of FIG. 1).

Specifically, the corrected scan image 1f is acquired by scanning the temporary digital dental prosthesis 14 (see FIG. 10), in which the temporary tooth part 16 (see FIG. 10) is corrected to include a profile of the occlusion correction surface part r12 (see FIG. 10) and a profile of the shape-matching correction surface part r11 (see FIG. 10), using the imaging device 10 (see FIG. 2). Therefore, the corrected scan image 1f is generated to display a temporary tooth part image which includes the surface information 18f on the corrected temporary occlusal surface part, in which the temporary occlusal surface part 18d (see FIG. 9) set in the three-dimensional work image 1d (see FIG. 9) is corrected to include an occlusion correction surface part rp12. In addition, the corrected scan image 1f is generated to display a temporary tooth part image which includes the surface information 17f on the corrected temporary shape-matching surface, in which the temporary shape-matching surface 17d (see FIG. 9) set in the three-dimensional work image 1d (see FIG. 9) is corrected to include a shape-matching correction surface part rp11.

In addition, a shape-matching region part m1 and an occlusion region part m2 are set on the basis of a boundary region x, which is selectively input along the outer boundary of the temporary shape-matching surface in the corrected scan image 1f, and a connecting part of the temporary tooth part. Here, the shape-matching region part m1 includes the surface information 17f on the corrected temporary shape-matching surface and surface information 19f on the corrected coupling region, and the occlusion region part m2 includes the surface information 18f on the corrected temporary occlusal surface part.

Then, when portions except for the shape-matching region part m1 and the occlusion region part m2 are erased from the surface information on the corrected temporary digital dental prosthesis, surface information on the inner surface-side of the shape-matching region part m1 may be exposed and set as an inner surface profile of the final digital dental prosthesis. In addition, a profile of the occlusal surface part, which occludes with the opposing dental arch, may be set on the basis of surface information on the outer surface-side of the occlusion region part m2.

Here, in the surface information on the temporary digital dental prosthesis, a plurality of points having predetermined coordinate values corresponding to outer shape information on the temporary digital dental prosthesis that is included in the corrected scan image 1f may be connected to each other and stored.

For example, the surface information on the temporary digital dental prosthesis may be stored as a stereolithography (STL) file and may be set to have a plurality of triangular surfaces by a plurality of points and lines connecting the points along the entire outer surface profile of the temporary digital dental prosthesis. Therefore, the corrected scan image 1f may be stored as a three-dimensional surface model in which the surface information on the temporary digital dental prosthesis is substantially hollow.

Here, the surface information on the temporary digital dental prosthesis includes surface information on an outer surface part of the temporary tooth part in which the surface is displayed to be substantially convex upward and the lower surface side is displayed to be concave. Here, when the shape-matching region part m1 and the occlusion region part m2 are set along the boundary region x and the connecting part of the temporary tooth part, portions except for the shape-matching region part m1 and the occlusion region part m2 are set as an erasing region d and deleted. In addition, when the erasing region d is deleted, the corrected temporary shape-matching surface 17f and the corrected coupling region 19f may be exposed to the outside.

Here, since the surface information on the temporary digital dental prosthesis is stored as planar information that does not have a substantial thickness, coordinate values relating to the inner surface-side profile of the shape-matching region part m1 and coordinate values relating to the outer surface-side profile of the shape-matching region part m1 are substantially the same. Therefore, design information on a shape-matching groove and a coupling groove of the final digital dental prosthesis may be precisely acquired on the basis of the surface information 17f on the temporary shape-matching surface and the surface information 19f on the coupling region, which are exposed due to deleting the erasing region d.

That is, according to the present invention, surface information for designing the final digital dental prosthesis may be clearly acquired using a simple method in which unnecessary portions are deleted from the corrected scan image 1f. Therefore, since design information on the final digital dental prosthesis, which precisely corresponds to the target dental arch-side gum part and the opposing dental arch, is clearly exposed and acquired, the precision of a final digital dental prosthesis 300, which is manufactured on the basis of the design information, may be significantly improved.

Here, the pieces of surface information 17f, 19f, and 18f on the temporary shape-matching surface, the coupling region, and the temporary occlusal surface part, which are displayed in the corrected scan image 1f, include digital data relating to the temporary digital dental prosthesis which is corrected corresponding to the profiles of the shape-matching correction surface part rp11 and the occlusion correction surface part rp12. Therefore, the pieces of surface information 17f, 19f, and 18f on the temporary shape-matching surface, the coupling region, and the temporary occlusal surface part substantially match the target dental arch-side gum part, from which the coupling part of the abutment protrudes, and the opposing dental arch. Therefore, the precision in installing the final digital dental prosthesis 300, which is designed and manufactured on the basis of the pieces of surface information 17f, 19f, and 18f, may be significantly improved.

Further, the surface information 19f on the coupling region corresponds to the shape of the inner circumferential surface of the support cylinder so that the temporary digital dental prosthesis 14 (see FIG. 10) may be substantially fixed by the fastening screw to the abutment placed in the target dental arch-side gum part. In addition, the surface information 19f on the coupling region is acquired in a corrected state in order to accurately match the coupling part of the abutment. Also, the surface information 18f on the temporary occlusal surface part is acquired in a corrected state so that, while the temporary digital dental prosthesis is installed on the target dental arch-side gum part, the burden on the jaw joint is minimized during mastication or occlusion between the target dental arch and the opposing dental arch, and stable occlusion is achieved.

Therefore, since the reliability of the corrected scan image 1f, which is acquired by scanning the corrected temporary digital dental prosthesis 14 (see FIG. 10), is significantly improved, the reliability in terms of shape-matching and occlusion inside the oral cavity of the final digital dental prosthesis 300, which is designed and manufactured on the basis of the corrected scan image 1f, may be significantly improved. Also, since the final digital dental prosthesis 300 is stably installed inside the oral cavity, the subject's discomfort during occlusion or mastication may be minimized.

Of course, according to circumstances, the surface information 17f on the temporary shape-matching surface and the surface information 19f on the coupling region, which are disposed to be concave in the surface information on the temporary digital dental prosthesis that is displayed in the corrected scan image 1f, may be reversed to be convex and utilized as design information on the final digital dental prosthesis 300.

Meanwhile, referring to FIG. 12, the surface information 17f on the temporary shape-matching surface and surface information 19e on one side end portion of the coupling region, which are exposed due to deleting the erasing region, are displayed in the corrected scan image 1f. Here, a virtual abutment 800d, which corresponds to the abutment placed in the target dental arch, may be virtually arranged to correspond to the surface information 19e on the one side end portion of the coupling region. In addition, the surface information 19e on the one side end portion of the coupling region is corrected and replaced along an outer boundary region of the virtually-arranged virtual abutment 800d. Here, the one side end portion of the coupling region is a portion that substantially matches the coupling part of the abutment and may be understood as a coupling end portion side of the support cylinder. In addition, the virtual abutment 800d virtually arranged in the corrected scan image 1f may be displayed by being substantially limited to surface information on the coupling part-side of the abutment.

Here, registration reference points are set and input to a portion where the virtual abutment 800d and the surface information 19e on the one side end portion of the coupling region correspond to each other. Here, the registration reference point input to the surface information 19e on the one side end portion of the coupling region may be automatically set or manually input to a portion without image distortion or damage. Also, the registration reference point of the virtual abutment 800d may be automatically set or manually input to a position corresponding to the registration reference point set or input to the surface information 19e on the one side end portion of the coupling region.

In addition, the virtual abutment 800d is virtually arranged on the corrected scan image 1f so that registration reference points of different objects overlap each other. Accordingly, even when the surface information 19e on the one side end portion of the coupling region is not clearly displayed due to saliva, foreign matter, or image distortion or damage that may occur in the scanning process, the surface information 19e may be corrected and replaced with the virtual abutment 800d and clearly displayed. Here, the virtual abutment 800d is displayed as digital data corresponding to the actual abutment placed in the target dental arch-side gum part. Therefore, a coupling groove 302a, which is formed in the final digital dental prosthesis 300, may be set to have a shape that precisely matches the shape of the actual abutment placed in the target dental arch-side gum part.

Meanwhile, profile information on a virtual teeth part is virtually arranged on a corrected image of a temporary tooth part that is displayed in the corrected scan image 1f. In addition, a virtual digital dental prosthesis, which includes the virtual teeth part replaced and corrected by matching between the surface information 17f on the corrected temporary shape-matching surface and the surface information 18f on the corrected temporary occlusal surface part, is virtually arranged. Therefore, an inner surface of the virtual teeth part is set to include a profile of the shape-matching correction surface part rp11, and an outer surface of the virtual teeth part is set to include a profile of the occlusion correction surface part rp12. Accordingly, the reliability in terms of shape-matching/occlusion between the target dental arch and the opposing dental arch may be significantly improved.

In addition, the virtual digital dental prosthesis including the virtual teeth part is virtually arranged on the corrected scan image 1f, and a virtual coupling groove is matched along an overlapping region between the virtual digital dental prosthesis and the virtual abutment 800d. That is, the inner surface profile of the virtual teeth part is set on the basis of the surface information 17f on the corrected temporary shape-matching surface, and the surface information 19e on the one side end portion of the coupling region is replaced and corrected with the virtual abutment 800d. In addition, an overlapping region between the virtual abutment 800d and the virtual teeth part is set as the virtual coupling groove. Therefore, the shape, position, and direction of the virtual coupling groove may be precisely designed by accurately reflecting the placement position and direction of the fixture/abutment placed in the target dental arch-side gum part, and the coupling groove 302a of the final digital dental prosthesis 300 may be accurately formed.

Also, the surface information 19f on the one side end portion of the coupling region that is displayed in the corrected scan image 1f is replaced and corrected with digital data of the virtual abutment 800d. Accordingly, the precision in matching with the fixture/abutment placed in the target dental arch-side gum part may be significantly improved. That is, since, when scanning the target dental arch-side gum part using the oral scanner, distortion due to intentional/unintentional movement of the subject, vibration, shaking, or saliva in the oral cavity is replaced and corrected with precise digital data, the accuracy of design information on the final digital dental prosthesis may be significantly improved.

Meanwhile, referring to FIG. 13, the final digital dental prosthesis 300 includes a denture frame 302 and a crown bridge 301. Also, in order to prevent the denture frame 302, which is made of a metal material, from being visually noticeable, a cover part 350 made of a ceramic material or the like that matches the color of gums may be provided below the denture frame 302. Of course, instead of the cover part being separately provided, an extension part corresponding to the color of gums may be formed below the denture frame 302 and post-processed.

Here, the denture frame 302 is a portion corresponding to gums and may be made of a ceramic or metal material having high strength and bio-affinity. In addition, a shape-matching groove is formed in one surface part of the denture frame 302, and a plurality of support protrusion parts 302b, to which the crown bridge 301 is coupled, are formed on the other surface part of the denture frame 302. Also, in the shape-matching groove, the coupling groove 302a is formed at a position where the above-described virtual coupling groove matches.

In addition, the crown bridge 301 is a portion corresponding to the temporary tooth part 16 (see FIG. 10) of the temporary digital dental prosthesis 14 (see FIG. 10) and may be formed of a ceramic, zirconia, or metal material having high strength and bio-affinity. A support groove part 301a, into which each support protrusion part 302b is inserted, is formed in one surface part of the crown bridge 301.

Here, each configuration of the final digital dental prosthesis 300 may be manufactured using a three-dimensional printer but may also be manufactured using a milling machine, a cutting machine, or the like for highly-precise processing without a limitation in the processing material. Accordingly, an artificial dental prosthesis having high processing precision and durability may be provided.

As described above, the present invention is not limited to each of the above-described embodiments and may be modified and practiced by those of ordinary skill in the art to which the present invention pertains without departing from the scope of the claims below, and such modifications fall within the scope of the present invention.

INDUSTRIAL APPLICABILITY

The present invention provides a digital dental prosthesis and a method of manufacturing the same in which the manufacturing convenience and precision are improved and thus may be applied to an industry for digital dental prostheses.

The invention claimed is:

1. A digital dental prosthesis manufacturing method comprising:
   a first step in which a three-dimensional work image is acquired, the three-dimensional work image including surface information on an inner side of an oral cavity and a target dental arch in which fixtures are placed and occlusion information between the target dental arch and an opposing dental arch;
   a second step in which a temporary digital dental prosthesis is designed and manufactured, the temporary digital dental prosthesis including a temporary tooth part having one side which, on the basis of the occlusion information, occludes with and corresponds to the opposing dental arch and the other side at which a temporary shape-matching surface, a shape of which matches a shape of the target dental arch, is formed and a coupling region is disposed to be aligned corresponding to arrangement positions of the fixtures and including an aligning shape-matching part integrally connected to an edge of the temporary tooth part and formed to have a shape that matches the surface information on the inner side of the oral cavity that is included in the three-dimensional work image;
   a third step in which the manufactured temporary digital dental prosthesis is installed on the target dental arch, wherein a corrected scan image of the temporary digital dental prosthesis is acquired in which a shape and size of the scanned temporary shape-matching surface and the coupling region are edited to more precisely match with the inner side of the oral cavity and the placed fixtures, and the aligning shape-matching part is incised to be separated and removed from the temporary tooth part; and
   a fourth step in which a virtual coupling groove is designed in an inner profile, which is generated according to surface information of the edited temporary shape-matching surface, to correspond to surface information of the edited coupling region, and a final digital dental prosthesis is designed and manufactured.

2. The digital dental prosthesis manufacturing method of claim 1, wherein, in the second step, a cutting line is set on a boundary between the temporary tooth part, which is adjacent to the temporary shape-matching surface, and the aligning shape-matching part, and a plurality of slots are formed at predetermined intervals along the cutting line.

3. The digital dental prosthesis manufacturing method of claim 2, wherein a plurality of connectors configured to connect the aligning shape-matching part to an edge of the temporary tooth part adjacent to the temporary shape-matching surface are formed, an incision line is formed to be bent on a boundary surface between the connector and a corner of the temporary tooth part, and a thickness of the connector is formed to be smaller than a thickness of the aligning shape-matching part.

4. The digital dental prosthesis manufacturing method of claim 1, wherein, in the second step, the surface information on the inner side of the oral cavity that is included in the three-dimensional work image includes a shape profile of stationary parts around the temporary shape-matching surface.

5. The digital dental prosthesis manufacturing method of claim 4, wherein, in the second step, when the target dental arch is a maxillary dental arch, the shape profile of the stationary parts around the temporary shape-matching surface includes an inner surface profile of a hard palate which is at a maxillary side, and, when the target dental arch is the mandibular dental arch, the shape profile of the stationary parts around the temporary shape-matching surface includes inner surface and outer surface profiles of a target gum part.

6. The digital dental prosthesis manufacturing method of claim 1, wherein, in the second step, a position and an angle of the coupling region are set corresponding to an outer surface profile of a virtually-arranged dental prosthesis so that the coupling region is coupled to the fixture.

7. The digital dental prosthesis manufacturing method of claim 1, wherein:
   the third step includes a step in which, while the corrected scan image of the temporary digital dental prosthesis is acquired in which the temporary shape-matching surface, which includes the coupling region, and a temporary occlusal surface part, which occludes with the opposing dental arch, are corrected, a curing resin is applied to the temporary shape-matching surface and the inner surface of the coupling region, the temporary shape-matching surface and the coupling region are installed on the target dental arch, a profile image of an occlusion correction surface part, which is modified and formed on the basis of a shape-matching correction surface part, which is formed as the curing resin is pressed due to a pressure caused by occlusion, and a pressure mark on the opposing dental arch side that is formed on the temporary occlusal surface part due to the pressure caused by the occlusion, is acquired and the corrected scan image is generated; and the fourth step includes a step in which an occlusal surface part is set according to the profile of the occlusion correction surface part, which is included in the corrected scan image, and the final digital dental prosthesis is designed and manufactured.

* * * * *